United States Patent
Mitchell et al.

(10) Patent No.: US 10,173,553 B2
(45) Date of Patent: Jan. 8, 2019

(54) HARNESS TIGHTENING SYSTEM FOR CAR SEATS

(71) Applicant: GRACO CHILDREN'S PRODUCTS INC., Atlanta, GA (US)

(72) Inventors: Thomas Jake Mitchell, Atlanta, GA (US); Nicholas James Lombardi, Atlanta, GA (US); Nicholas Henry Reaves, Marietta, GA (US); Daniel J. Brunick, Cumming, GA (US); Andrew Phillip Kitchens, Kennesaw, GA (US)

(73) Assignee: GRACO CHILDREN'S PRODUCTS INC., Atlanta, GA (US)

(*) Notice: Subject to any disclaimer, the term of this patent is extended or adjusted under 35 U.S.C. 154(b) by 30 days.

(21) Appl. No.: 15/415,419

(22) Filed: Jan. 25, 2017

(65) Prior Publication Data
US 2017/0210254 A1    Jul. 27, 2017

Related U.S. Application Data

(60) Provisional application No. 62/287,214, filed on Jan. 26, 2016.

(51) Int. Cl.
*B60N 2/28* (2006.01)

(52) U.S. Cl.
CPC ......... *B60N 2/2812* (2013.01); *B60N 2/2821* (2013.01); *B60N 2/2872* (2013.01); *B60N 2/2875* (2013.01)

(58) Field of Classification Search
CPC ...... B60N 2/2812; B60N 2/28; B60N 2/2875; B60N 2/2866; B60N 2/2815

USPC ................. 297/256.13, 250.1, 484
See application file for complete search history.

(56) References Cited

U.S. PATENT DOCUMENTS

| | | | | |
|---|---|---|---|---|
| 5,681,094 A * | 10/1997 | Brown | ................. | B60N 2/2812 297/484 |
| 6,471,298 B2 * | 10/2002 | Carine | ................. | B60N 2/2806 297/482 |
| 6,513,870 B1 * | 2/2003 | Takizawa | .............. | B60N 2/2812 297/216.11 |
| 6,799,807 B1 * | 10/2004 | Chen | .................... | B60N 2/2812 297/250.1 |
| 6,916,066 B2 * | 7/2005 | Sedlack | ................. | A47D 13/02 24/198 |
| 8,777,322 B2 * | 7/2014 | Horton | ................. | B60N 2/2812 297/216.11 |
| 9,714,002 B2 * | 7/2017 | Cheng | ..................... | B60R 22/30 |

(Continued)

*Primary Examiner* — Jose V Chen
(74) *Attorney, Agent, or Firm* — Eversheds Sutherland (US) LLP

(57) ABSTRACT

A child car seat can include a seat base and a seat shell. The seat shell can include a seat bottom and a seat back along a front side of the seat shell. Shoulder straps can be provided to assist holding a child in place in the car seat. The shoulder straps can extend through openings in the seat back of the seat shell and can be coupled to a splitter plate positioned along a back side of the seat shell. The splitter plate can include a slot for receiving a tightening strap and a roller or radiused edge positioned adjacent the slot to help the tightening strap slide along the roller or radiused edge when tension is applied to it. The tightening strap can be routed through the slot and under the seat shell and can pass through another slot along the seat bottom to tighten the shoulder straps.

18 Claims, 12 Drawing Sheets

(56) References Cited

U.S. PATENT DOCUMENTS

| | | | | |
|---|---|---|---|---|
| 2004/0251722 A1* | 12/2004 | Boyle | ................. | B60N 2/2812 297/250.1 |
| 2005/0110318 A1* | 5/2005 | Meeker | ................ | B60N 2/2812 297/256.16 |
| 2007/0063556 A1* | 3/2007 | Santamaria | .......... | B60N 2/2812 297/250.1 |
| 2007/0210639 A1* | 9/2007 | Berger | ................ | B60N 2/2809 297/470 |
| 2007/0228787 A1* | 10/2007 | Nakhla | ................ | B60N 2/2812 297/250.1 |
| 2010/0264706 A1* | 10/2010 | Vogt | ..................... | B60N 2/2812 297/250.1 |
| 2011/0006569 A1* | 1/2011 | Davies | ..................... | B60N 2/26 297/217.4 |
| 2012/0074758 A1* | 3/2012 | Gates | ................... | B60N 2/2812 297/479 |
| 2012/0169098 A1* | 7/2012 | Spence | ............... | B60N 2/2812 297/256.15 |
| 2014/0021757 A1* | 1/2014 | Mo | ...................... | B60R 22/105 297/250.1 |
| 2014/0070597 A1* | 3/2014 | Powell | ................ | B60N 2/2812 297/484 |
| 2014/0265489 A1* | 9/2014 | Morgenstern | ........ | B60N 2/2812 297/256.15 |
| 2015/0158456 A1* | 6/2015 | Cheng | ................ | B60N 2/2812 297/480 |
| 2015/0314711 A1* | 11/2015 | Mitsuo | ................. | B60N 2/2812 297/256.15 |
| 2016/0059748 A1* | 3/2016 | Cohen | ................. | B60N 2/2884 297/183.7 |
| 2017/0120791 A1* | 5/2017 | Denbo | ................... | B60N 3/103 |
| 2017/0144624 A1* | 5/2017 | Geist | ........................ | B60N 2/28 |

* cited by examiner

HARNESS TIGHTENING SYSTEM FOR CAR SEATS

RELATED APPLICATIONS

This application claims priority under 35 U.S.C. § 119 to U.S. Provisional Patent Application No. 62/287,214 filed Jan. 26, 2016, and titled "Harness Tightening System for Car Seats," the entire contents of which are hereby incorporated herein by reference for all purposes.

TECHNICAL FIELD

Embodiments disclosed herein are generally related to child restraint systems and more particularly to apparatuses and methods for child safety seats including a harness tightening system.

BACKGROUND

Child restraint systems are commonly used to conveniently and safely seat and transport infants and small children. Many states require that children below a certain age and/or weight be placed within a child safety seat when riding in an automobile and the use of restraint systems in these child safety seats can further protect children in the event of an incident (e.g., accident, sudden deceleration and/or sudden acceleration).

Such restraint systems typically include a child safety seat that includes a seat shell and a harness system (e.g., one or more safety belts) to secure the infant or child in the seat shell of the child safety seat. A child can be positioned within the seat shell and then the harness system can be coupled together and tightened to fit the size and shape of the particular child. Portions of the harness system can run along one or both of the back side and the bottom side of the seat shell. When the harness system is tightened, these portions of the harness system that run along the back and/or bottom sides of the seat shell can experience a higher than desired level of friction due to these portions of the harness system rubbing along the back and/or bottom sides of the seat shell. This increased level of friction on the harness system can make it difficult to tighten the harness system around the child. In certain situations, this can result in the harness system being left too loose around the child and reducing the effectiveness of the harness system during an incident. In other situations, excess force may be applied to a tightening strap of the harness system to try and overcome the increased level of friction. This can result in the harness system being tightened too much on the child, which can also increase the risk of injury to the infant or child.

BRIEF DESCRIPTION OF THE SEVERAL VIEWS OF THE DRAWINGS

For a more complete understanding of the present disclosure and certain features thereof, reference is now made to the following description, in conjunction with the accompanying figures briefly described as follows.

DETAILED DESCRIPTION OF THE EXEMPLARY EMBODIMENTS

Example embodiments of the disclosure now will be described more fully hereinafter with reference to the accompanying drawings, in which example embodiments are shown. The concepts claimed may, however, be embodied in many different forms and should not be construed as limited to the example embodiments set forth herein. Rather, these embodiments are provided so that this disclosure will be thorough and complete, and will fully convey the scope of the concepts claimed to those of ordinary skill in the art. Like numbers refer to like, but not necessarily the same or identical, elements throughout.

Certain dimensions and features of the novel child restraint system are described herein using the term "approximately." As used herein, the term "approximately" indicates that each of the described dimensions is not a strict boundary or parameter and does not exclude functionally similar variations therefrom. Unless context or the description indicates otherwise, the use of the term "approximately" in connection with a numerical parameter indicates that the numerical parameter includes variations that, using mathematical and industrial principles accepted in the art (e.g., rounding, measurement or other systematic errors, manufacturing tolerances, etc.), would not vary the least significant digit.

In addition, certain relationships between dimensions of the novel child restraint system described herein and between features of the child restraint system are described herein using the term "substantially." As used herein, the terms "substantially" and "substantially equal" indicates that the equal relationship is not a strict relationship and does not exclude functionally similar variations therefrom. Unless context or the description indicates otherwise, the use of the term "substantially" or "substantially equal" in connection with two or more described dimensions or positions indicates that the equal relationship between the dimensions or positions includes variations that, using mathematical and industrial principles accepted in the art (e.g., rounding, measurement or other systematic errors, manufacturing tolerances, etc.), would not vary the least significant digit of the dimensions. As used herein, the term "substantially constant" indicates that the constant relationship is not a strict relationship and does not exclude functionally similar variations therefrom. As used herein, the term "substantially parallel" indicates that the parallel relationship is not a strict relationship and does not exclude functionally similar variations thereof. As used herein the term "substantially orthogonal" with reference to two or more elements indicates that the perpendicular relationship of the two or more elements is not a strict relationship and does not exclude functionally similar variations thereof.

Figure 1:
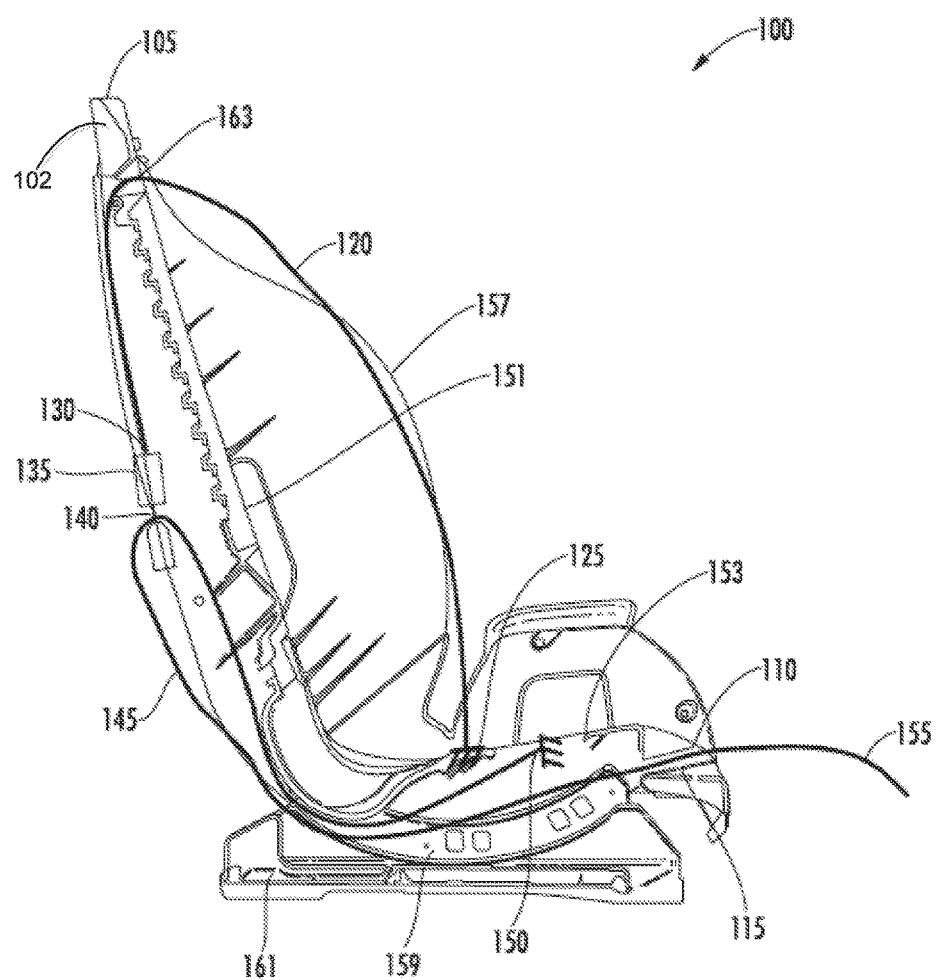
FIG. 1 shows an illustration of a child restraint system in accordance with one example embodiment of the disclosure.

FIG. 1 is a side elevation view of a child restraint system 100 having a harness tightening system according to one example embodiment of the disclosure. Referring now to FIG. 1, the example child restraint system 100 can include a child safety seat (or car seat) 102 having a seat shell 105, a seat base 161 disposed beneath the seat shell 105, and a seat tilting mechanism 159 disposed generally between the seat base 161 and the seat shell 105. The seat base 161 can include a bottom surface configured to rest along the top surface of an automobile seat. The seat tilting mechanism 159 can allow the seat shell 105 to be adjusted through a range of angles with respect to the seat base 161.

The seat shell 105 can be made of any material including, but not limited to, plastic, metal or a combination thereof. In one example embodiment, the seat shell 105 can be formed of a molded plastic and can include a front side, for receiving a child therein, and an opposing rear side. The front side of the seat shell 105 can include a seat back 151 or backrest and a seat base 153 or seat bottom upon which a child can sit. The seat shell 105 can also include a pair of side retaining walls 157 extending forward from the seat back 151 at or adjacent to the opposing, vertically extending sides of the seat back 151. In one example, the side retaining walls are configured to limit side-to-side movement of the child while in the child restraint system 100.

The seat shell 105 can also include a first central adjuster 110 disposed generally along the front side of the seat bottom 153. The first central adjuster 110 can include a slot 115 or passageway disposed through the seat shell 105 that extends from the front or top side of the seat bottom 153 to a bottom side of the seat bottom 153 under the seat shell 105. In one example, the slot 115 can define an opening to and provide a passageway through the seat shell 105 from the bottom side of the seat bottom 153 to a front side of the seat bottom 153. In certain example embodiments the slot 115 further provides a passageway from the front side of the seat bottom 153 to a rear side of the seat shell 105 (e.g., along the rear side of the seat back 151).

The child restraint system 100 can also include a pair of armrests. Each armrest can be positioned above the top surface of the seat bottom 153. For example, each armrest can be coupled to or integrally formed with the seat shell along opposing lateral sides of the seat bottom 153.

The child restraint system 100 can also include at least a pair of shoulder straps 120a, 120b (collectively referred to as "shoulder straps 120" or "shoulder strap 120") (only one shoulder strap 120 is shown for example purposes in FIG. 1). Each of the shoulder straps 120 can include a first end 125 and a distal second end 130. The first end of the shoulder strap 125 can be removably coupled directly or indirectly to the seat shell 105. In one example embodiment, each first end 125 of each shoulder strap 120 may be threaded through or otherwise slidably attached and adjustable along a chest harness (not shown). The chest harness can be removably coupled to a chest harness clip (not shown). In one example, the chest harness can include a latch plate (not shown) that is configured to be removably coupled to the chest harness clip. For example, the chest harness clip can be coupled directly or indirectly to the seat shell 105 and can include a latch (not shown) having a release mechanism. The latch can be configured to receive the latch plate and couple the chest harness to the chest harness clip. The release mechanism is configured to disengage the chest harness from the chest harness clip by, for example, releasing the latch plate from the latch.

The second end 130 of the shoulder strap 120 can be coupled to one end of a pulley splitter plate 135. For example, each shoulder strap 120 can be fed through one of multiple harness slots (not shown) in a seat back 151 of the seat shell 105. Each harness slot can define a passageway from the front side to the rear side of the seat shell. In one example, the multiple harness slots can be paired (such that each receives one of the at least two shoulder straps 120a, 120b) and oriented vertically along the seat back 151 of the seat shell 105 to provide a vertical positioning adjustment for the shoulder straps 120 as they pass from the front side of the seat back 151 to the rear side of the seat back 151. In one example, four pairs of harness slots are oriented vertically along the seat back 151 of the seat shell 105. However, greater or fewer numbers of harness slots can be provided along the seat back 151. The example pulley splitter plate 135 can include a slot 140 or strap receiving arm disposed therein or thereon for coupling each second end 130 of the shoulder straps 120 to the pulley splitter plate 135.

The child restraint system 100 can also include a harness adjustment/tightening strap 145 having a first end 150 and a distal second end 155. The first end of the harness tightening strap 150 can be coupled directly or indirectly to the car seat 102. For example, the first end of the harness tightening strap 150 can be coupled to the seat base 161, the seat tilting mechanism 159, or along the bottom or rear side of the seat shell 105. The harness tightening strap 145 can extend through or otherwise be routed through both the slot 140 in the pulley splitter plate 135 and the slot 115 through the seat shell 105 adjacent the first central adjuster 110 to pass the tightening strap 145 through the seat shell 105 from the rear or bottom side of the seat shell 105 to the front side of the seat shell 105 and terminate at the second end 155 of the seat strap 145.

Figure 2A:
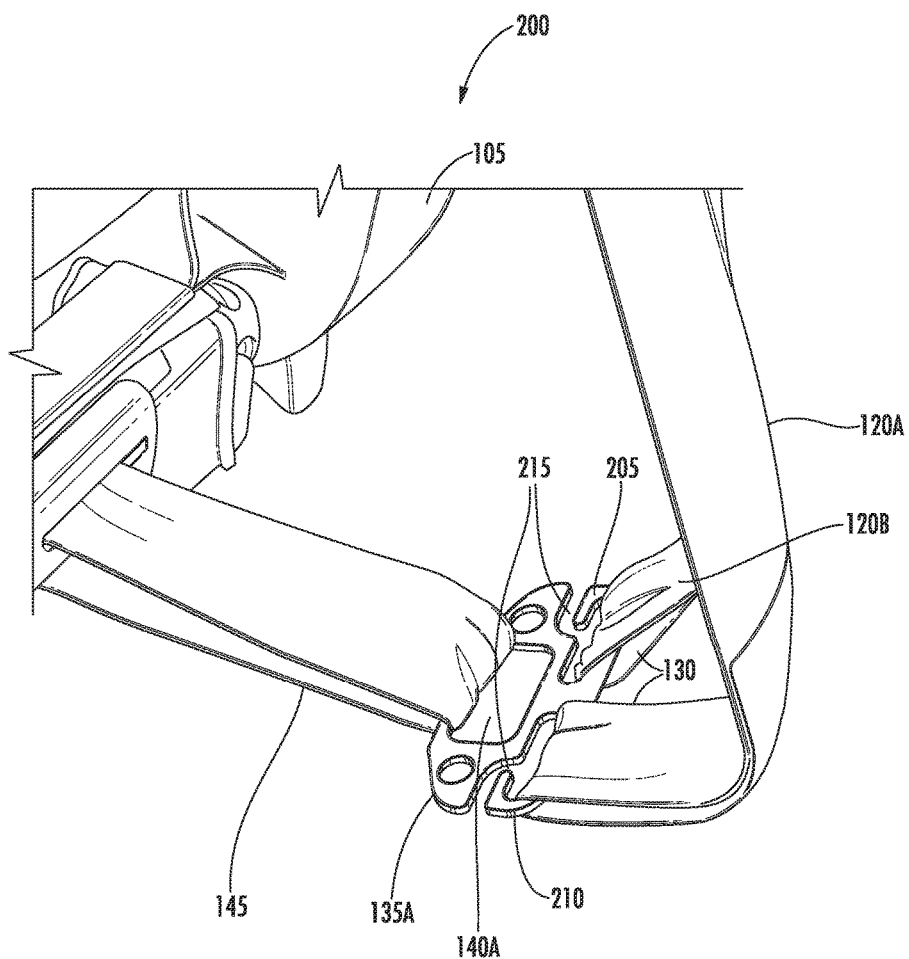
FIG. 2A is a partial rear view of the child restraint system including one example of a splitter plate and pulley system in accordance with one example embodiment of the disclosure.
Figure 2B:
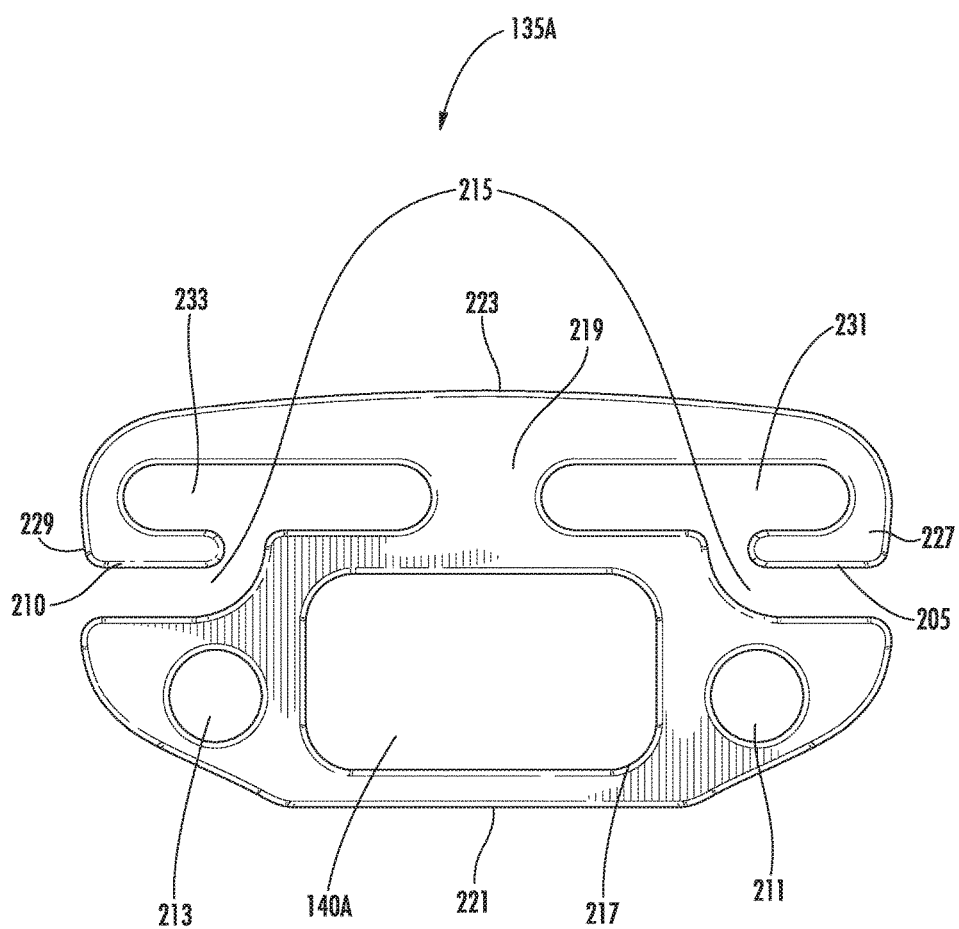
FIG. 2B is a partial rear view of the child restraint system including one example of a splitter plate and pulley system in accordance with one example embodiment of the disclosure.

FIGS. 2A and 2B are a partial rear view of a child restraint system 200 showing one example embodiment of a pulley splitter plate 135A in accordance with one example embodiment of the disclosure. Referring now to FIGS. 1 and 2A-2B, the example pulley splitter plate 135A can include a first end 221, a second end 223, a first side edge 227, and a distal second side edge 229. In one example, the pulley splitter plate 135A can be made from a single piece of material, such as metal, metal alloy, or plastic. A slot 140A or aperture through the pulley splitter plate 135A can be positioned between the first 221 and second 223 ends and between the first side edge 227 and the second side edge 229. The slot can be defined by an outer perimeter edge 217 in the splitter plate 135A. The outer perimeter edge 217 can have a rounded edge or beveled edge to promote a smooth movement of the harness tightening strap 145 along the surface of the outer perimeter edge 217 when the tightness of the harness is being adjusted. In one example, the slot 140A can be configured to receive therethrough the harness tightening strap 145. The harness tightening strap 145 can extend through the slot 140A in the pulley splitter plate 135A and be routed through the seat shell 105 as discussed with reference to FIG. 1.

The splitter plate 135A can also include one or more weight-reducing apertures 211, 213 disposed through the pulley splitter plate 135A. In one example, the apertures 211, 213 can be circular or any other shape and can be configured to reduce the overall weight of the splitter plate 135A. While two weight-reducing apertures 211, 213 are shown in FIG. 2B, this is for example purposes only, as the number of weight-reducing apertures can be any number greater or less than two in other example embodiments.

The pulley splitter plate 135A can also include one or more strap receiving arms 205, 210. Each strap receiving arm 205, 210 can be positioned at or near the second end of the pulley splitter plate 135. In one example, the first strap receiving arm 205 can extend inward generally from the first side edge 227 towards the second side edge 229 and can terminate at a rounded edge. The second strap receiving arm 210 can extend inward generally from the second side edge 229 towards the first side edge 227 and can also terminate at a rounded edge. In the example of FIGS. 2A-2B, two strap receiving arms 205, 210 are shown, however, this is for example purposes only as greater of fewer numbers of strap receiving arms can be provided on the pulley splitter plate 135A.

In one example embodiment pulley splitter plate 135A can also include a first shoulder strap receiving aperture 231 and a second shoulder strap receiving aperture 233. Each of the first 231 and second 233 shoulder strap receiving apertures are configured to receive a portion of one of the shoulder straps 120A, 120B therethrough for coupling the shoulder straps 120A, 120B to the pulley splitter plate 135A. The first shoulder strap receiving aperture 231 can be positioned between the second end 223 of the splitter plate 135A and the first strap receiving arm 205. The second shoulder strap receiving aperture 233 can be positioned between the second end 223 of the splitter plate 135A and the second strap receiving arm 210. Each of the shoulder straps 120A, 120B can be slidably inserted through the corresponding first 231 and second 233 shoulder strap receiving apertures and either coupled to themselves (e.g., stitched or riveted to another portion of the corresponding shoulder strap 120A or 120B) or the pulley splitter plate 135A.

The pulley splitter plate 135A can also include a divider member 219 positioned between the first shoulder strap receiving aperture 231 and the second shoulder strap receiving aperture 233 to prevent the corresponding shoulder straps 120A and 120B from moving from the first shoulder strap receiving aperture 231 to the second shoulder strap receiving aperture 233 or vice versa. In one example, the divider member can be a solid piece that is integrally formed with the other portions of the pulley splitter plate 135A and can extend from the second end 223 of the splitter plate to the outer perimeter edge 217 of the slot 140A.

The pulley splitter plate 135A can also include a pair of passageways 215. Each passageway 215 can extend from the corresponding first 227 or second 229 side edge and extend to the corresponding first 231 or second 233 shoulder strap receiving aperture. Each passageway 215 can also provide an opening or path between the terminating end of the corresponding strap receiving arm 205, 210 and the remainder of the pulley splitter plate 135A to provide a passageway for inserting the corresponding shoulder strap 120A, 120B into the respective first 231 or second 233 shoulder strap receiving apertures or removing or otherwise decoupling the corresponding shoulder strap 120A, 120B from the respective first 231 or second 233 shoulder strap receiving apertures.

In another example embodiment, the pulley splitter plate 135A can include just one shoulder strap receiving aperture which is configured to receive both the shoulder straps 120A, 120B therethrough. In this example embodiment, the pulley splitter plate 135A can also include one strap receiving arm and one passageway that extends from either the first 227 or second 229 side edge and extends into the one shoulder strap receiving aperture. This one passageway can also provide an opening or path between the terminating end of the one strap receiving arm and the remainder of the pulley splitter plate 135A to provide a passageway for inserting each of the shoulder straps 120A, 120B into the strap receiving aperture or removing or otherwise decoupling the shoulder straps 120A, 120B from the one strap receiving aperture.

Figure 3A:
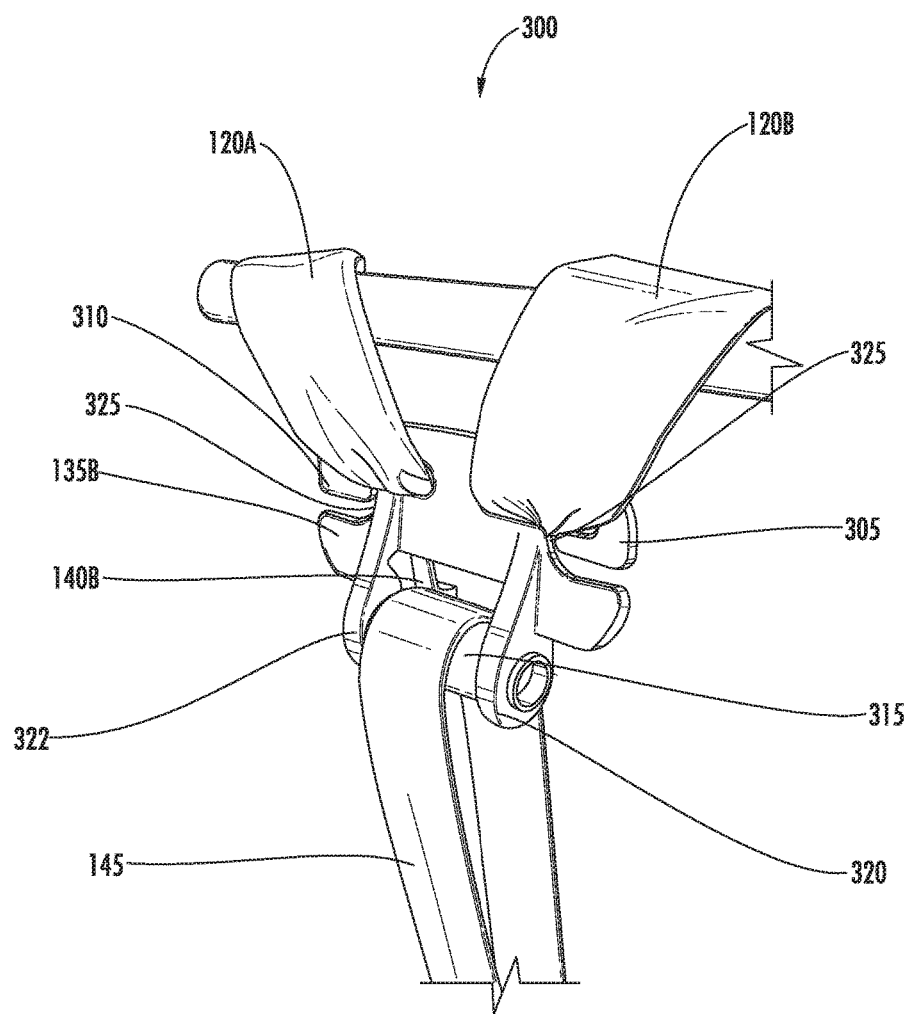
FIG. 3A is a partial rear view of the child restraint system including another example of a splitter plate and pulley system in accordance with one example embodiment of the disclosure.
Figure 3B:
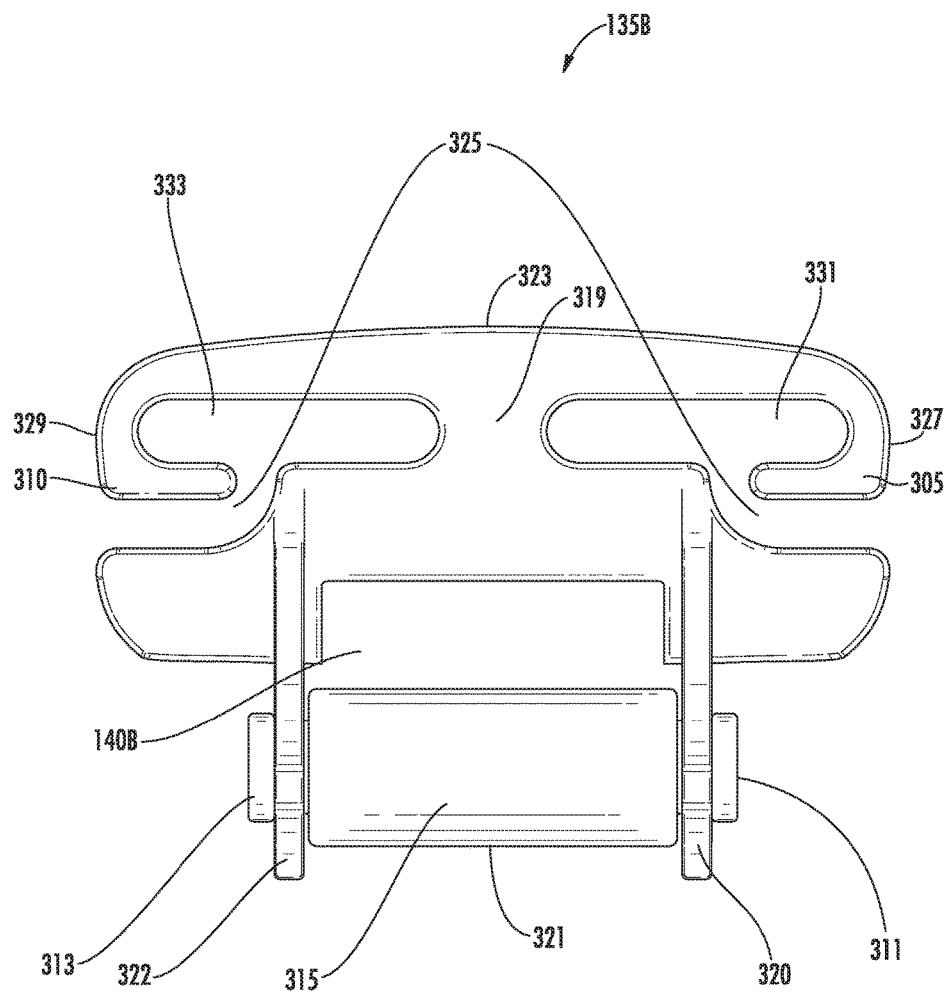
FIG. 3B is a partial rear view of the child restraint system including another example of a splitter plate and pulley system in accordance with one example embodiment of the disclosure.

FIGS. 3A-3B are a partial rear view of the child restraint system 300 including another example of a splitter plate and pulley system 135B in accordance with one example embodiment of the disclosure. Now referring to FIGS. 1 and 3A-3B, the example pulley splitter plate 135B can include a first end 321, a second end 323, a first side edge 327, and a distal second side edge 329. In one example, the pulley splitter plate 135B can be made from any type of material, such as metal, metal alloy, or plastic. A slot 140B or aperture through the pulley splitter plate 135B can be positioned between the first 321 and second 323 ends and between the first side edge 327 and the second side edge 329. In one example, the slot 140B can be configured to receive therethrough the harness tightening strap 145. The harness tightening strap 145 can extend through the slot 140B in the pulley splitter plate 135B and be routed through the seat shell 105 as discussed with reference to FIG. 1.

The splitter plate 135B can also include one or more weight-reducing apertures (not shown) disposed through the pulley splitter plate 135B. In one example, the apertures can be circular or any other shape and can be configured to reduce the overall weight of the splitter plate 135B.

The pulley splitter plate 135A can also include one or more strap receiving arms 305, 310. Each strap receiving arm 305, 310 can be positioned at or near the second end 323 of the pulley splitter plate 135B. In one example, the first strap receiving arm 305 can extend inward generally from the first side edge 327 towards the second side edge 329 and can terminate at a rounded edge. The second strap receiving arm 310 can extend inward generally from the second side edge 329 towards the first side edge 327 and can also terminate at a rounded edge. In the example of FIGS. 3A-3B, two strap receiving arms 305, 310 are shown, however, this is for example purposes only as greater of fewer numbers of strap receiving arms can be provided on the pulley splitter plate 135B.

The pulley splitter plate 135B can also include a first shoulder strap receiving aperture 331 and a second shoulder strap receiving aperture 333. Each of the first 331 and second 333 shoulder strap receiving apertures are configured to receive a portion of one of the shoulder straps 120A, 120B therethrough for coupling the shoulder straps 120A, 120B to the pulley splitter plate 135B. The first shoulder strap receiving aperture 331 can be positioned between the second end 323 of the splitter plate 135B and the first strap receiving arm 305. The second shoulder strap receiving aperture 333 can be positioned between the second end 323 of the splitter plate 135B and the second strap receiving arm 310. Each of the shoulder straps 120A, 120B can be slidably inserted through the corresponding first 331 and second 333 shoulder strap receiving apertures and either coupled to themselves (e.g., stitched or riveted to another portion of the corresponding shoulder strap 120A or 120B) or the pulley splitter plate 135B.

The pulley splitter plate 135B can also include a divider member 319 positioned between the first shoulder strap receiving aperture 331 and the second shoulder strap receiving aperture 333 to prevent the corresponding shoulder straps 120A and 120B from moving from the first shoulder strap receiving aperture 331 to the second shoulder strap receiving aperture 333 or vice versa. In one example, the divider member 319 can be a solid piece that is integrally formed with the other portions of the pulley splitter plate 135B and can extend from the second end 323 of the splitter plate to the slot 140B.

The pulley splitter plate 135B can also include a pair of passageways 325. Each passageway 325 can extend from the corresponding first 327 or second 329 side edge and extend to the corresponding first 331 or second 333 shoulder strap receiving aperture. Each passageway 325 can also provide an opening or path between the terminating end of the corresponding strap receiving arm 305, 310 and the remainder of the pulley splitter plate 135B to provide a passageway for inserting the corresponding shoulder strap 120A, 120B into the respective first 331 or second 333 shoulder strap receiving apertures or removing or otherwise decoupling the corresponding shoulder strap 120A, 120B from the respective first 331 or second 333 shoulder strap receiving apertures.

In another example embodiment, the pulley splitter plate 135B can include just one shoulder strap receiving aperture which is configured to receive both the shoulder straps 120A, 120B therethrough. In this example embodiment, the pulley splitter plate 135B can also include one strap receiving arm and one passageway that extends from either the first 227 or second 229 side edge and extends into the one shoulder strap receiving aperture. This one passageway can also provide an opening or path between the terminating end of the one strap receiving arm and the remainder of the pulley splitter plate 135A to provide a passageway for inserting each of the shoulder straps 120A, 120B into the strap receiving aperture or removing or otherwise decoupling the shoulder straps 120A, 120B from the one strap receiving aperture.

The pulley splitter plate 135B can also include a roller 315 disposed along the first end 321 of the pulley splitter plate 135B adjacent to the slot 140B. While the example pulley splitter plate 135B of FIGS. 3A-3B shows a single roller/pulley 315, in other example embodiments, multiple rollers/pulley 315 may be included to further reduce the amount of mechanical force needed to pull the tightening strap 145. In one example, the roller 315 can include a first end and an opposing second end. Each of the first and second ends of the roller 315 can be disposed between a pair of roller mounting arms 320, 322 that are coupled to the splitter plate 135B. In one example, the roller 315 is coupled to each of the roller mounting arms 320, 322 using conventional coupling devices 311, 313 (e.g., bearing sleeves, bearings, bearing mounts, etc) and rotates about an axis orthogonal to a longitudinal axis of each of the roller mounting arms 320, 322. In an alternate embodiment, the roller 315 does not rotate but instead provides a smooth rounded outer surface to promote the travel of the tightening strap 145 about the outer surface of the roller 315. The tightening strap 145 can extend through the slot 140B and about at least a portion of the roller 315 in the pulley splitter plate 135B and be routed through the seat shell 105 as discussed with reference to FIG. 1.

Figure 4A:
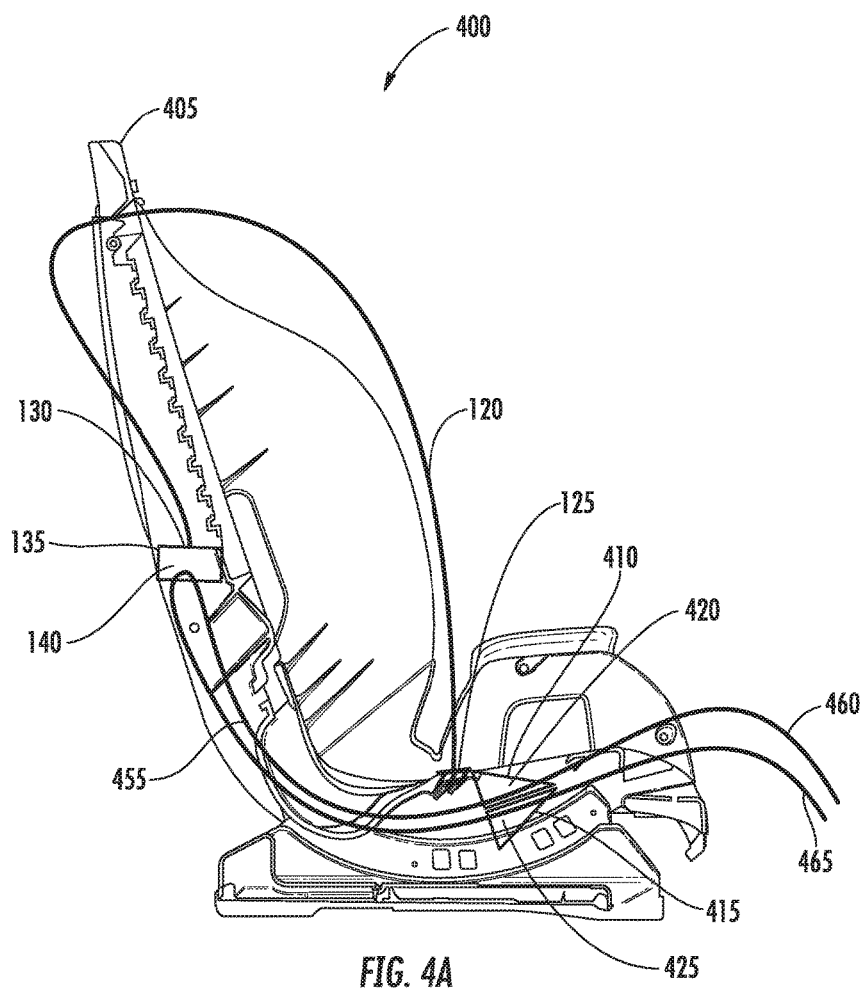
FIG. 4A shows an illustration of a child restraint system having an alternative strap tightening system in accordance with one example embodiment of the disclosure.
Figure 4B:
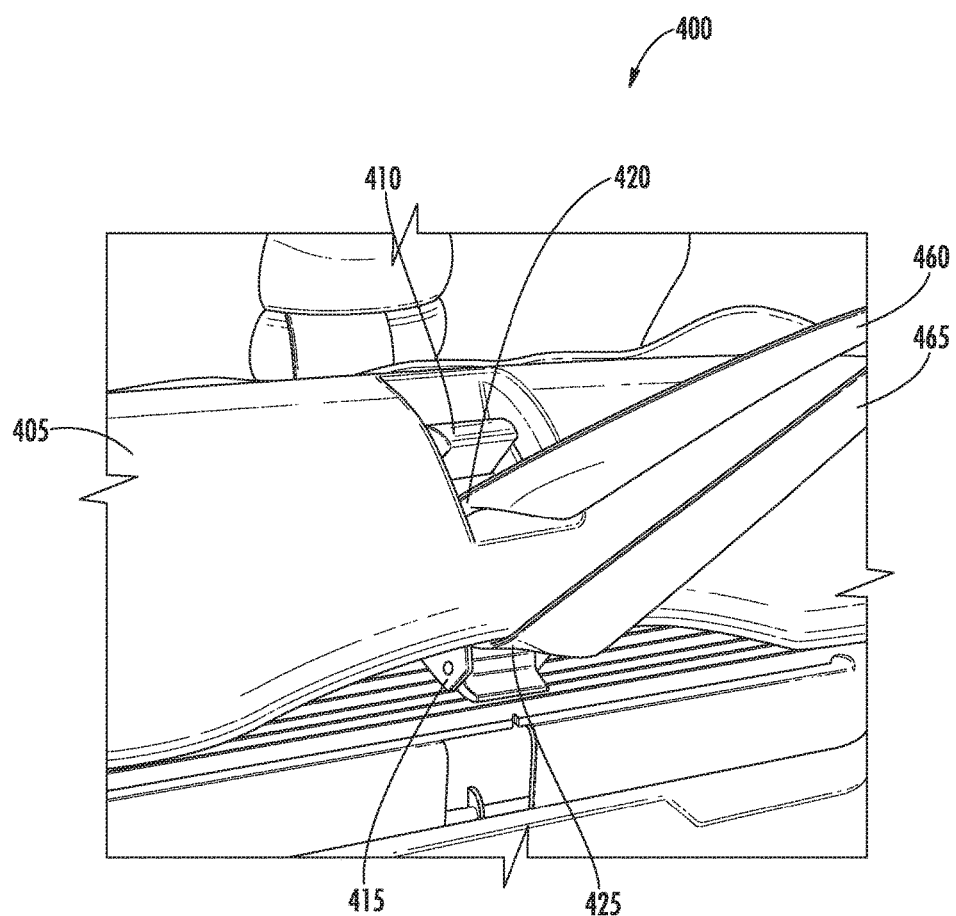
FIG. 4B is a partial front view of the child restraint system in accordance with one example embodiment of the disclosure.

FIGS. 4A and 4B respectively show an illustration and a partial front view of a child restraint system 400 having an alternative strap tightening system in accordance with one example embodiment of the disclosure. The child restraint system 400 is capable of being used with either of the pulley splitter plates 135A, 135B described in FIGS. 2A-2B and 3A-3B. Referring now to FIGS. 1-4B, the child restraint system 400 can include a car seat having a seat base, seat tilting mechanism, and seat shell 405. In one example, the material and formation of the seat base, seat tilting mechanism, and seat shell 405 are substantially the same as that of the seat shell 105 in FIG. 1. For example, the seat shell 405 can be made of any material including, but not limited to, plastic, metal or a combination thereof. In one example embodiment, the seat shell 105 can be formed of a molded plastic and can include a front side having a seat back and seat bottom, for receiving a child thereon, and an opposing rear side.

The seat shell 405 can also include a first central adjuster 410 disposed generally along the seat bottom on the front side of the seat shell 405. The first central adjuster 410 can include a slot 420 or opening through the seat bottom and disposed in the seat shell 405. In one example, the slot 420 can define an opening to and provide a passageway through the seat shell 405 from the front side to the rear or bottom side of the seat shell 405 for receiving a first end 460 of a tightening strap 455 therethrough. The seat shell 405 can also include a second central adjuster 415 disposed generally along the seat bottom along the front side of the seat shell 405 and near or adjacent to the first central adjuster 410. The second central adjuster 415 can include a slot 425 or opening through the seat bottom and disposed in the seat shell 405. In one example, the slot 425 can define another opening to and provide a passageway through the seat shell 405 from the front side to the rear or bottom side of the seat shell 405 for receiving a second end 465 of the tightening strap 455 therethrough.

The child restraint system 400 can also include at least a pair of shoulder straps 120 (only one shown for purposes of example) having a first end 125 and a second end 130 and designed and configured in the same manner as that described in FIG. 1, including the uses of a chest harness and chest harness clip as described in FIG. 1 the description of which is incorporated herein by reference. Similar to that discussed in FIG. 1, the second end 130 of each of the shoulder straps 120 (120A and 120B) is connected to a pulley splitter plate 135, such as, for example, either of the pulley splitter plates 135A, 135B discussed in FIGS. 2A-2B and 3A-3B above.

The child restraint system 400 can also include a tightening strap 455 having a first end 460 and a distal second end 465. In one example, the first end 460 of the tightening strap 455 extends under the bottom of the seat shell 405 through the slot 425 (to pass from under the seat shell 405 to the front side of the seat shell 405) and freely out from the front side of the seat shell 405. The tightening strap 455 extends or otherwise passes through the slot 420 in the first central adjuster 410, passes along the bottom side and the rear side of the seat shell 405 to and through the slot 140 in the pulley splitter plate 135 in order to slide about the pulley or outer perimeter edge of the slot 140, then extends back along the rear side and bottom side of the seat shell 405 and passes through the slot 425 in the second central adjuster 415, and terminates at the freely extending second end 465 of the tightening strap 455. In one example embodiment, the seat shell 405 can also include an actuator mechanism (e.g., button, lever, tab, etc.) (not shown). In addition, the first central adjuster 410 and the second central adjuster 415 can each include a locking mechanism (not shown) directly or indirectly coupled to the actuator mechanism. In one example each locking mechanism is configured to prevent movement of the tightening strap 455 through the corresponding slot 420,425 in either direction. In one example, each locking mechanism can include a clamp or clutch assembly for limiting movement of the tightening strap 455 through the corresponding slot 420, 425. In certain example embodiments, the actuator mechanism can be configured to unlock one or both locking mechanisms of the first central adjuster 410 and the second central adjuster 415 when actuated.

In one example embodiment, the first end 460 of the tightening strap 455 can be attachable and detachable from the second end 465 of the tightening strap 455 by, for example, a reversible fastening mechanism such as Velcro, a snap, or a button (e.g., the first end 460 of the tightening strap 455 is detachable from the second end 465 of the tightening strap 455). Alternatively, the first end 460 of the tightening strap 455 can be permanently attached to the second end 465 of the tightening strap 455 by, for example, a permanent fastening mechanism such as sewing, riveting, or heat welding.

Figure 5:
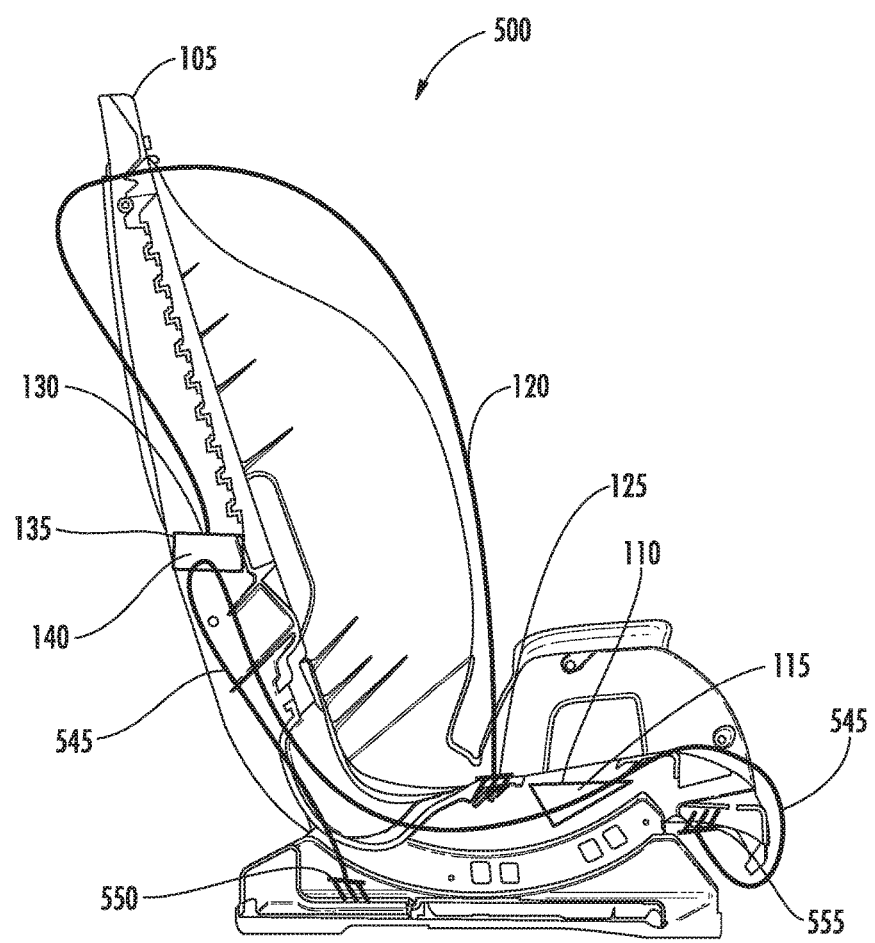
FIG. 5 shows an illustration of a child restraint system in accordance with one example embodiment of the disclosure.

FIG. 5 shows an illustration of another child restraint system 500 in accordance with another example embodiment of the disclosure. The child restraint system 500 is substantially the same as that described with regards to FIGS. 1-3B except with regards to the tightening strap 545, as discussed below. Further, the child restraint system 500 can incorporate the use of either pulley splitter plate 135A, 135B described in FIGS. 2A-2B and 3A-3B. Accordingly, the description of FIGS. 1-3B is incorporated herein with regards to FIG. 5. In addition, the child restraint system 500 can include a tightening strap 545 having a first end 550 and a distal second end 555. The first end of the tightening strap 550 can be coupled directly or indirectly to the seat base, seat tilting mechanism, and/or the seat shell 105, such as to the rear or bottom side of the seat shell 105. The tightening strap 545 can extend through or otherwise be routed through both the slot 140 in the pulley splitter plate 135, along the back and bottom side of the seat shell 105 and through the slot 115 in the first central adjuster 110 to pass the tightening strap 545 through the seat shell 105 from the rear or bottom side of the seat shell 105 to the front side of the seat shell 105 and can terminate at the second end 555 of the seat strap 545. The second end 555 of the tightening strap 545 can then be permanently or removably coupled to the seat shell 105. In certain example embodiments, the second end 555 can be coupled to a seat base disposed generally along the bottom, front side of the seat shell 105. In other example embodiments, the second end 555 can be coupled to the seat base, the seat tilting mechanism, or a front or bottom side of the seat shell 105 using known attachment devices and techniques, such as screws, rivets, clamps, tie-offs, etc.

Figure 6:
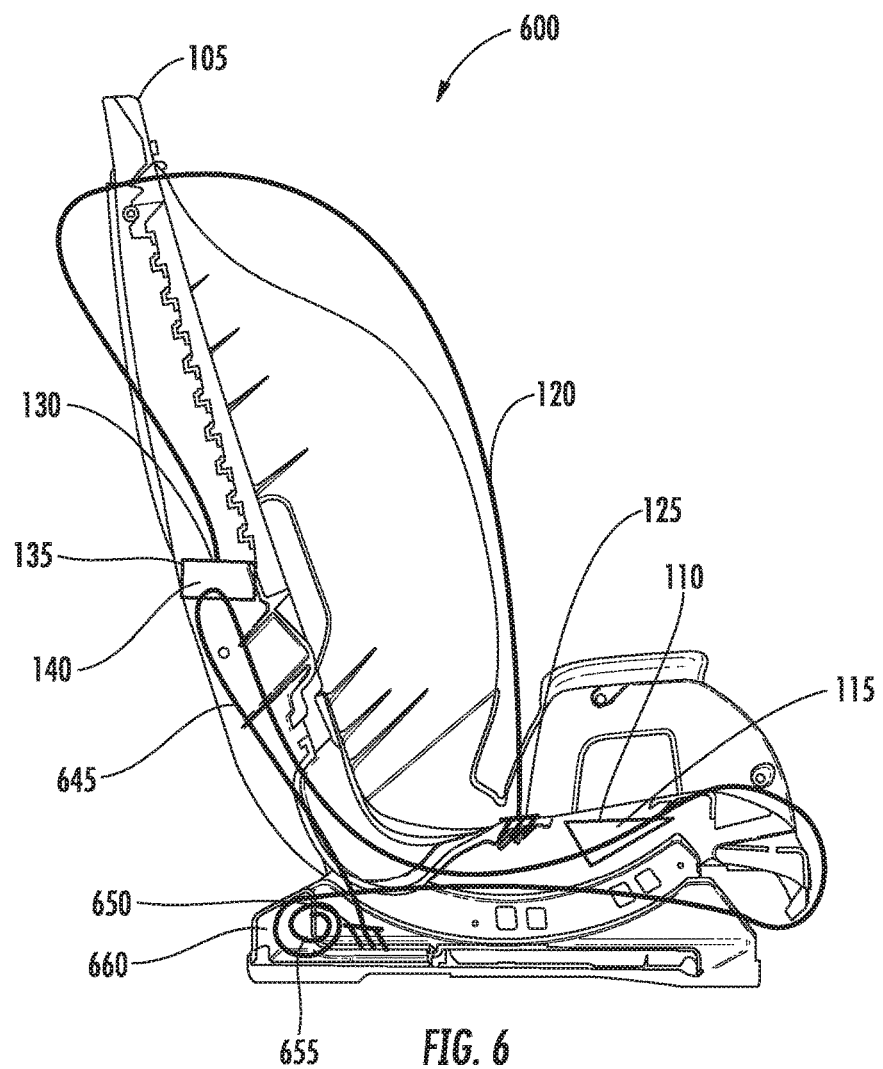
FIG. 6 shows an illustration of a child restraint system in accordance with one example embodiment of the disclosure.

FIG. 6 illustrates another child restraint system 600 in accordance with another example embodiment of the disclosure. The child restraint system 600 is substantially the same as that described with regards to FIGS. 1-3B except with regards to the tightening strap 645, as discussed below. Further, the child restraint system 600 can incorporate the use of either pulley splitter plate 135A, 135B described in FIGS. 2A-2B and 3A-3B. Accordingly, the description of FIGS. 1-3B is incorporated herein with regards to FIG. 6. In addition, the child restraint system 600 can include a tightening strap 645 having a first end 650 and a distal second end 655. The first end 650 of the tightening strap 645 can be coupled directly or indirectly to the seat base, seat tilting mechanism, or seat shell 105, such as to the rear or bottom side of the seat shell 105. The tightening strap 645 can extend through or otherwise be routed through the slot 140 in the pulley splitter plate 135, along the back and bottom sides of the seat shell 105 and through the slot 115 in the first central adjuster 110 to pass the tightening strap 645 through the seat shell 105 from the rear or bottom side of the seat shell 105 to the front side of the seat shell 105 and terminate at the second end 655 of the seat strap 645. The child restraint system 600 can also include a strap retractor system 660. The second end 655 of the tightening strap 645 can be coupled to the strap retractor system 660. In one example embodiment, the strap retractor system 660 can be a constant force sprint-biased spring coiler that can be configured to coil up or otherwise reel in any slack in the tightening strap 645. In another example embodiment, the strap retractor system 660 can include a manually operated hand crank that extends out from along the side of the seat base, seat tilting mechanism, or seat shell and can be rotated, turned, or otherwise adjusted by a user to reel in and/or coil up any slack in the tightening strap 645.

Figure 7:
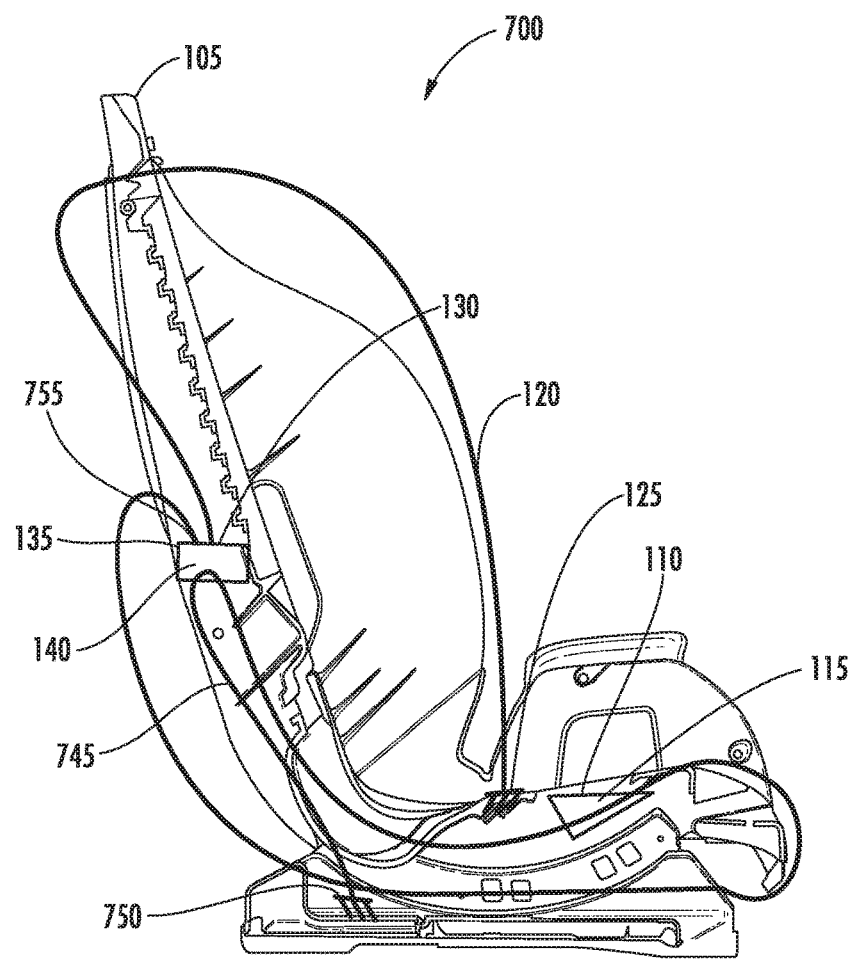
FIG. 7 shows an illustration of a child restraint system in accordance with one example embodiment of the disclosure.

FIG. 7 illustrates a child restraint system 700 in accordance with another example embodiment of the disclosure. The child restraint system 700 is substantially the same as that described with regards to FIGS. 1-3B except with regards to the tightening strap 745, as discussed below. Further, the child restraint system 700 can incorporate the use of either pulley splitter plate 135A, 135B described in FIGS. 2A-2B and 3A-3B. Accordingly, the description of FIGS. 1-3B is incorporated herein with regards to FIG. 7. In addition, the child restraint system 700 can also include a tightening strap 745 having a first end 750 and a distal second end 755. The first end 750 of the tightening strap 745 can be coupled directly or indirectly to the seat base, seat tilting mechanism, or the seat shell 105, such as to the rear or bottom side of the seat shell 105. The tightening strap 745 can extend through or otherwise be routed through the slot 140 in the pulley splitter plate 135, along the back and bottom sides of the seat base 105, and through the slot 115 in the first central adjuster 110 to pass the tightening strap 745 through the seat shell 105 from the rear side and/or bottom side of the seat shell 105 to the front side of the seat shell 105. The tightening strap 745 can then be routed around the lower front portion of seat bottom of the seat shell 105 back under the seat shell (e.g., between the seat base and the seat shell 105 or through the seat base) and back around to the rear side of the seat shell. The second end 755 of the tightening strap 745 can then be permanently or removably coupled to the pulley splitter plate 135. For example, the second end of the tightening strap 745 can be coupled to the pulley splitter plate 135 by routing it back through one of the shoulder strap receiving apertures in the pulley splitter plate 135.

Figure 8A:
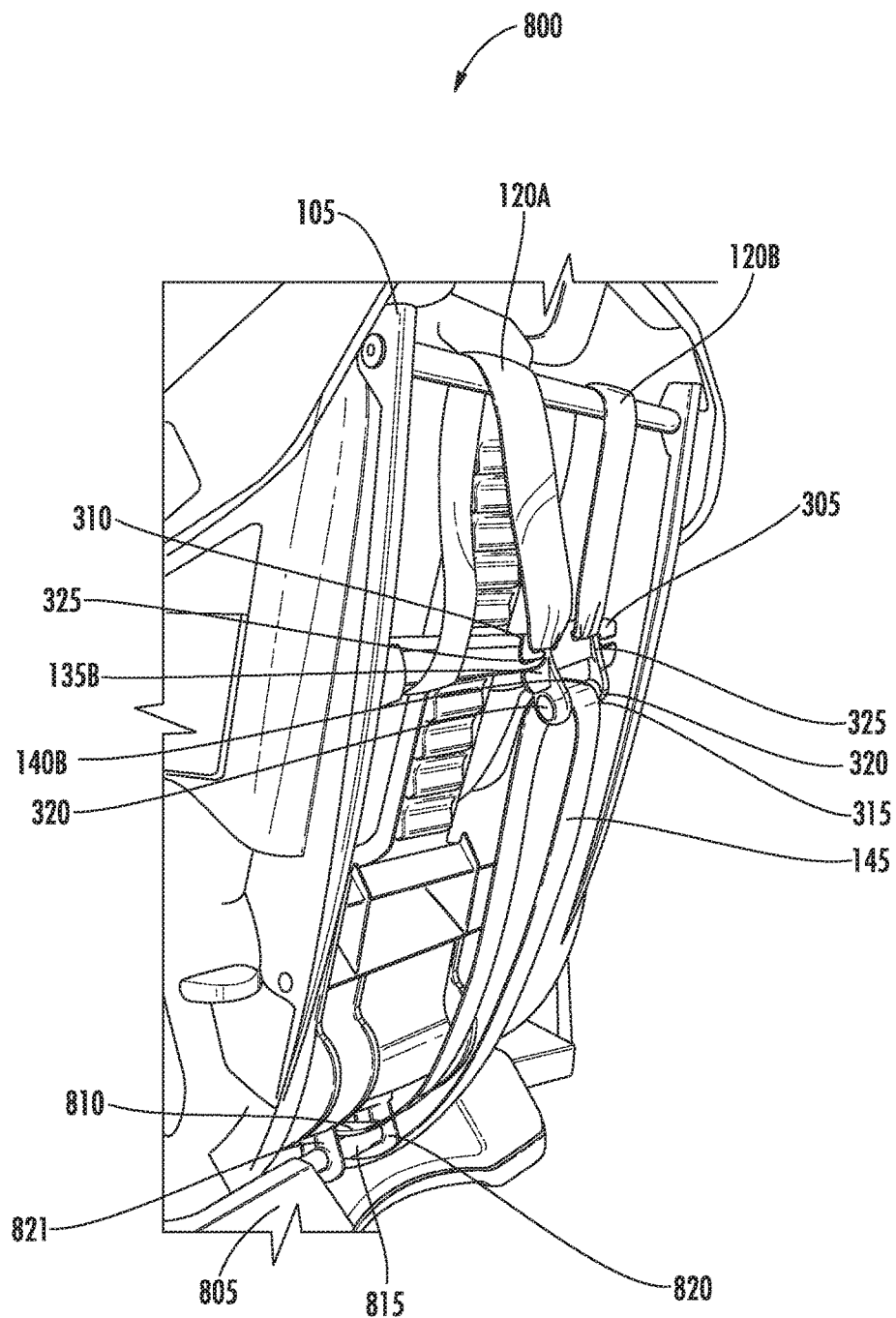
FIG. 8A is a partial rear perspective view of the child restraint system in accordance with one example embodiment of the disclosure.
Figure 8B:
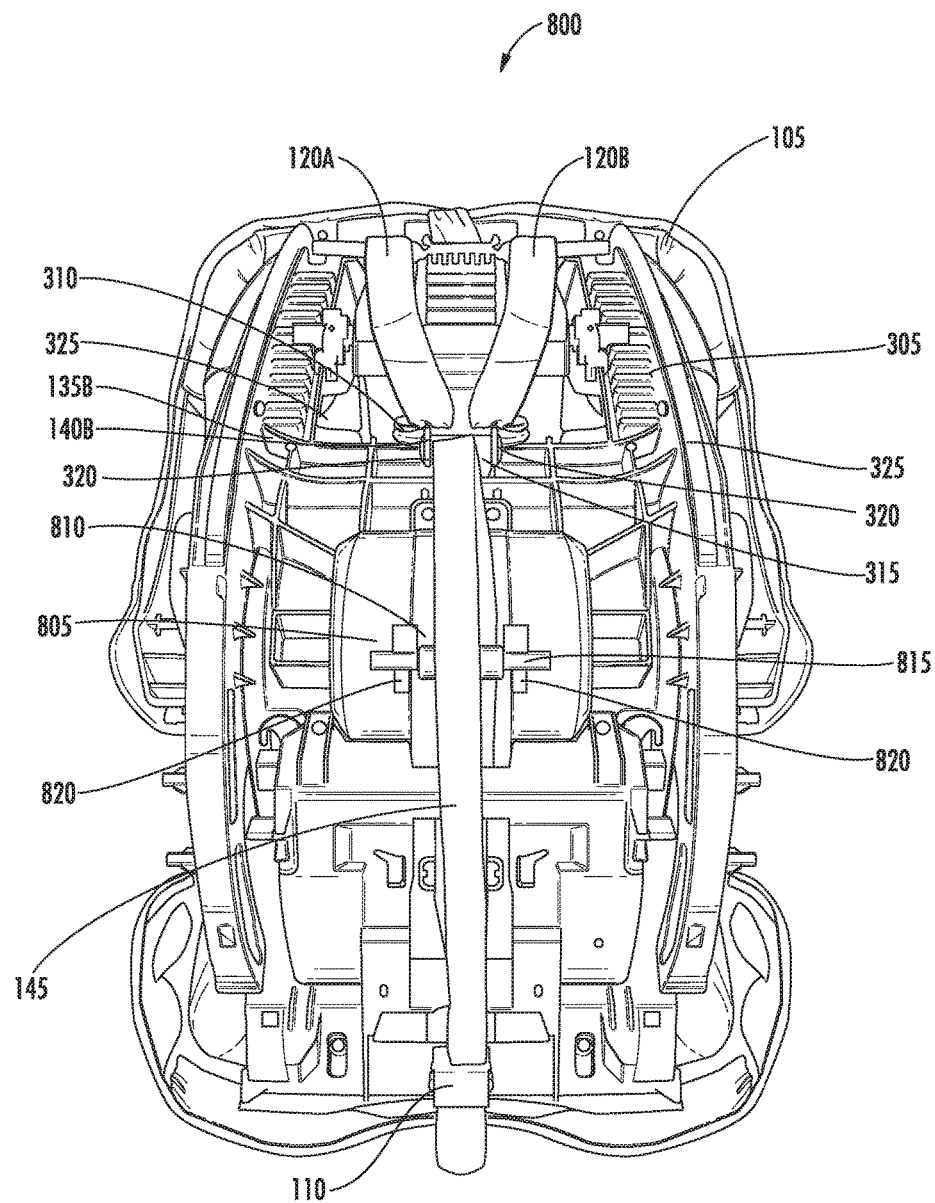
FIG. 8B is a rear elevation view of a child restraint system in accordance with one example embodiment of the disclosure.

FIGS. 8A and 8B respectively are a partial rear perspective view and a rear elevation view of a child restraint system 800 having additional friction-reducing features in accordance with the example embodiments of the disclosure. The child restraint system 800 is substantially the same as that described with regards to FIGS. 1 and 3A-3B except with regards to the friction-reducing feature 805, as discussed below. Accordingly, the description of FIGS. 1 and 3A-3B is incorporated herein with regards to FIGS. 8A-8B.

In an alternate embodiment, the child restraint system 800 can use pulley splitter plate 135A as described in FIG. 2 rather than pulley splitter plate 135B as described in FIGS. 3A-3B.

Referring now to FIGS. 8A-8B, the child restraint system 800 can include one or more friction-reducing features 805. Each friction-reducing feature 805 can be attached directly or indirectly to the seat shell 105. An aperture 810 can be positioned between the friction-reducing feature 805 and the back or bottom side of the seat shell 105. In one example, the aperture 810 can be configured to receive therethrough the tightening strap 145. The friction-reducing feature 805 can also include a roller 815 disposed adjacent to the aperture 810. In one example, the roller 815 can include a first end and an opposing second end. Each of the first and second ends of the roller 815 can be disposed between a pair of roller mounting arms 820, 821. In one example, the roller 815 is coupled to each of the roller mounting arms 820, 821 using conventional coupling devices (e.g., bearings, bearing mounts, bearing blocks, axles, etc.) and rotates about an axis orthogonal to a longitudinal axis of each of the roller mounting arms 820, 821. In an alternate embodiment, the roller does not rotate but instead provides a smooth rounded outer surface to promote sliding travel of the tightening strap about the outer surface of the roller 815. In another alternate embodiment, the friction-reducing feature can be a smooth rounded surface of the seat shell 105 upon which the tightening strap can slide along. The tightening strap 145 can extend through the aperture 810, about a first side of the roller 815 proximate to the seat shell 105, about a second side of the roller 815 distal to the seat shell 105 (or along the outer surface of the smooth rounded surface of the seat shell 105), and be routed through the seat shell 105 as discussed with reference to FIG. 1. Any one or more of the example friction reducing features discussed above (or a combination thereof) can be positioned adjacent the splitter plate 135A, 135B between the splitter plate 135A, 135B and the remainder of the seat shell 105, along the junction of the seat back 151 and seat bottom 153 along the rear side of the seat shell 105, anywhere between that junction and the splitter plate 135A, 135B and/or anywhere between that junction and the first central adjuster 110.

The child restraint system can include one or more features that reduce the force used to tighten the harness. For example, the child restraint system can include one or more additional pulleys/rollers that provide a mechanical advantage in addition to the pulley/roller shown in the pulley splitter plate. In another example, the child restraint system can include one or more friction-reducing features. For example, a friction-reducing feature can be configured to reduce a friction force between a seat shell and a tightening strap when the tightening strap is in contact with the seat shell. In another example, a friction-reducing feature can be configured to reduce a friction force between a seat shell and one or more shoulder straps when the one or more shoulder straps is in contact with the seat shell. In another example, a friction-reducing feature can be configured to reduce a friction force between a first part of a tightening strap and a second part of the tightening strap. In some embodiments, the friction-reducing feature is a pulley, a roller, a bushing, or a rounded edge.

While the above description contains many specifics, these specifics should not be construed as limitations on the scope of the disclosure, but merely as exemplifications of the disclosed embodiments. Those skilled in the art will envision many other possible variations that are within the scope of the disclosure.

What is claimed is:

1. A child car seat comprising:
    a seat shell comprising:
        a seat back;
        a seat bottom; and
        a first slot disposed through the seat bottom and providing a passageway from a front side to a rear side of the seat shell;
    a splitter plate disposed along the rear side of the seat shell and including a second slot disposed therein;
    a first shoulder strap and a second shoulder strap, each of the first and the second shoulder straps having a first end disposed along the front side of the seat shell and a distal second end disposed through a portion of the splitter plate; and
    a tightening strap comprising a first end directly coupled to the seat shell and a distal second end, wherein the tightening strap extends through the second slot in the splitter plate and the second end of the tightening strap extends through the first slot in the seat bottom of the seat shell.

2. The child car seat of claim 1, wherein the second end of the tightening strap is coupled to the seat shell.

3. The child car seat of claim 1, further comprising a spring-biased strap retractor reel, wherein the second end of the tightening strap is coupled to the strap retractor reel.

4. The child car seat of claim 1, wherein the splitter plate further comprises:
    at least one shoulder strap receiving aperture configured to receive the first shoulder strap and the second shoulder strap therethrough.

5. The child car seat of claim 4, wherein the splitter plate further comprises:
    at least one shoulder strap receiving passageway extending from at least one of a first side edge and a second side edge of the splitter plate to the at least one shoulder strap receiving aperture.

6. The child car seat of claim 1, wherein the splitter plate further comprises:
    a first shoulder strap receiving aperture configured to receive the first shoulder strap therethrough;
    a second shoulder strap receiving aperture configured to receive the second shoulder strap therethrough;
    a first shoulder strap receiving passageway extending from a first side edge of the splitter plate to the first shoulder strap receiving aperture; and
    a second shoulder strap receiving passageway extending from a second side edge of the splitter plate opposite the first side edge to the second shoulder strap receiving aperture.

7. The child car seat of claim 1, wherein the second slot is defined by an outer perimeter edge and wherein at least a portion of the outer perimeter edge is radiused in a direction of travel of the tightening strap through the second slot.

8. The child car seat of claim 1, wherein the splitter plate further comprises a cylindrical roller rotatably coupled to the splitter plate.

9. The child car seat of claim 8, wherein the splitter plate further comprises:
    a first roller mounting arm coupled to the splitter plate and rotatably coupled to a first end of the cylindrical roller; and
    a second roller mounting arm coupled to the splitter plate and rotatably coupled to a second end of the cylindrical roller.

10. The child car seat of claim 1, wherein the seat shell further comprises a friction-reducing feature, wherein the friction-reducing feature is configured to reduce a friction force between the seat shell and the tightening strap when the tightening strap is in contact with the seat shell.

11. The child car seat of claim 10, wherein the friction-reducing feature is one of a roller rotatably coupled to the seat shell or a smooth rounded surface.

12. The child car seat of claim 10, wherein the friction-reducing feature is positioned along a rear side of the seat shell.

13. The child car seat of claim 1, further comprising:
a seat base configured to be positioned along a top surface of an automobile seat; and
a seat tilting mechanism coupled to the seat shell and movably adjustable along the seat base.

14. A child car seat comprising:
a seat shell comprising:
  a first shoulder strap slot disposed through a seat back of the seat shell and providing a first passageway through the seat shell;
  a second shoulder strap slot disposed through the seat back and providing a second passageway through the seat shell; and
  a first tightening strap slot disposed through a seat bottom of the seat shell and providing a third passageway through the seat shell;
a first shoulder strap comprising a first end and a distal second end, wherein the first end of the first shoulder strap is disposed along a front side of the seat shell and a portion of the first shoulder strap is disposed through the first shoulder strap slot;
a second shoulder strap comprising a first end and a distal second end, wherein the first end of the second shoulder strap is disposed along the front side of the seat shell and a portion of the second shoulder strap is disposed through the second shoulder strap slot;
a splitter plate disposed along a rear side of the seat shell and comprising:
  a second tightening strap slot; and
  a cylindrical roller rotatably coupled to the splitter plate,
a tightening strap comprising a first end and a distal second end, wherein the tightening strap extends through the second tightening strap slot and along a portion of the cylindrical roller in the splitter plate and extends through the first tightening strap slot in the seat shell.

15. The child car seat of claim 14, wherein the splitter plate further comprises:
at least one shoulder strap receiving aperture, wherein a second portion of the first shoulder strap is disposed through the at least one shoulder strap receiving aperture; and
wherein a second portion of the second shoulder strap is disposed through the at least one shoulder strap receiving aperture.

16. A child car seat comprising:
a seat shell comprising a first tightening strap slot disposed through a seat bottom of the seat shell and providing a passageway through the seat shell from a front side of the seat bottom towards a rear side of the seat shell;
a first shoulder strap comprising a first end and a distal second end, wherein the first end of the first shoulder strap is disposed along a front side of the seat shell and a portion of the first shoulder strap is disposed through the seat shell;
a second shoulder strap comprising a first end and a distal second end, wherein the first end of the second shoulder strap is disposed along the front side of the seat shell and a portion of the second shoulder strap is disposed through the seat shell;
a splitter plate disposed along a rear side of the seat shell and comprising a second tightening strap slot provided in the splitter plate, the second tightening strap slot defined by an outer perimeter edge of the second tightening strap slot, wherein at least a portion of the outer perimeter edge is rounded in a direction of travel of a tightening strap through the second tightening strap slot; and
the tightening strap comprising a first end and a distal second end, wherein the tightening strap extends through the second tightening strap slot and contacts a portion of the rounded portion of the outer perimeter edge of the second tightening slot and the second end of the tightening strap extends through the passageway of the first tightening strap slot and extends out from the front side of the seat bottom of the seat shell.

17. The child car seat of claim 16, wherein the splitter plate further comprises:
at least one shoulder strap receiving aperture, wherein a second portion of the first shoulder strap is disposed through the at least one shoulder strap receiving aperture; and
wherein a second portion of the second shoulder strap is disposed through the at least one shoulder strap receiving aperture.

18. The child car seat of claim 16, wherein the first end of the tightening strap is directly coupled to the seat shell.

* * * * *